United States Patent [19]

Henry

[11] Patent Number: 4,711,818
[45] Date of Patent: Dec. 8, 1987

[54] FUSING MEMBER FOR ELECTROSTATOGRAPHIC REPRODUCING APPARATUS

[75] Inventor: Arnold W. Henry, Pittsford, N.Y.
[73] Assignee: Xerox Corporation, Stamford, Conn.
[21] Appl. No.: 866,666
[22] Filed: May 27, 1986
[51] Int. Cl.[4] .................. B32B 27/00; B32B 9/04; B32B 15/04
[52] U.S. Cl. .................. 428/421; 428/447; 428/450
[58] Field of Search .................. 428/421, 447, 450, 422

[56] References Cited

U.S. PATENT DOCUMENTS

| | | | |
|---|---|---|---|
| 3,225,419 | 12/1965 | Milton et al. | 29/132 |
| 3,967,042 | 6/1976 | Laskin et al. | 428/422 |
| 4,000,339 | 12/1976 | Murphy | 428/447 |
| 4,011,362 | 3/1977 | Stewart | 428/447 |
| 4,147,832 | 4/1979 | Namiki | 428/375 |
| 4,171,397 | 10/1979 | Morrow | 428/195 |
| 4,303,735 | 12/1981 | Kehrer et al. | 428/391 |
| 4,341,875 | 7/1982 | Visger et al. | 521/164 |
| 4,357,388 | 11/1982 | Minor | 428/331 |
| 4,360,566 | 11/1982 | Shimizu et al. | 428/447 |
| 4,375,505 | 3/1983 | Newkirk | 430/99 |
| 4,485,066 | 11/1984 | Balthis et al. | 264/341 |
| 4,556,624 | 12/1985 | Gruber et al. | 430/110 |
| 4,659,621 | 4/1987 | Finn et al. | 428/447 X |

FOREIGN PATENT DOCUMENTS

| | | | |
|---|---|---|---|
| 1144674 | 7/1986 | Japan | 428/447 |
| 1144675 | 7/1986 | Japan | 428/447 |

Primary Examiner—John E. Kittle
Assistant Examiner—Susan Rucker

[57] ABSTRACT

A thermally conductive dry release fuser member and fusing method for use in electrostatic reproducing machine without the application of a release agent is described, wherein the fusing member comprises a base support member and a thin deformable layer of a composition coated thereon, the composition comprising the crosslinked product of a mixture of at least one addition curable vinyl terminated or vinyl pendant polyfluoroorganosiloxane, filler, heat stabilizer, a crosslinking agent and a crosslinking catalyst.

22 Claims, 2 Drawing Figures

FUSING MEMBER FOR ELECTROSTATOGRAPHIC REPRODUCING APPARATUS

The present invention relates to a fuser method and a method of fusing for electrostatographic reproducing apparatus. In particular, it relates to a dry release fuser member for use without the application of a release agent.

BACKGROUND OF THE INVENTION

As indicated in U.S. Pat. No. 4,078,286, in a typical process for electrophotographic duplication, a light image of an original to be copied is recorded in the form of an electrostatic latent image upon a photosensitive member, and the latent image is subsequently rendered visible by the application of electroscopic particles, which are commonly referred to as toner. The visible toner image is then in a loose, powdered form and it can be easily disturbed or destroyed. The toner image is usually fixed or fused upon a support which may be the photosensitive member itself or another support such as a sheet of plain paper. A principle aspect of the present invention relates to the fusing of the toner image upon a support.

The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Several approaches to thermal fusing of electroscopic toner images have been described in the prior art. These methods include providing the application of heat and pressure substantially concurrently by various means: a roll pair maintained in pressure contact; a flat or curved plate member in pressure contact with a roll; a belt member in pressure contact with a roll; and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and they can be adjusted to suit particular machines or process conditions.

One approach to thermal fusing of toner material images onto the supporting substrate has been to pass the substrate with the unfused toner images thereon between a pair of opposed roller members at least one of which is internally heated. During operation of a fusing system of this type, the support member to which the toner images are electrostatically adhered is moved through the nip formed between the rolls with the toner image contacting the fuser roll thereby to affect heating of the toner images within the nip. Typical of such fusing devices are two roll systems wherein the fusing roll is coated with an abhesive material, such as a silicone rubber or other low surface energy elastomer or, for example, tetrafluoroethylene resin sold by E. I. DuPont de Nemours under the trademark TEFLON. The silicone rubbers which can be used as the surface of the fuser member can be classified into three groups according to the vulcanization method and temperature, i.e. room temperature vulcanization silicone rubber hereinafter referred to as RTV silicone rubber, liquid injection moldable or extrudable silicone rubber, and high temperature vulcanization type silicone rubber, referred to as HTV rubber. All these silicone rubbers or elastomers are well known in the art and are commercially available.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip effects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The so called "hot offset" occurs when the temperature of the toner is raised to a point where the toner particles liquify and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. While many materials may initially function with good release properties with continued use, they tend to be contaminated with paper fibers, debris and toner as a result of hot offset of toner, thereby increasing the surface energy of the roll and perpetuating the destruction of release performance. In addition, once the roll becomes contaminated the hot offset temperature starts to reduce and may reach a level near or below the minimum temperature necessary to fuse the toner image thereby leading to both incomplete fusing of the toner image and offsetting of the toner image to the fuser roll. Once the fuser roll begins to be contaminated, contaminates are likely to be transferred to the pressure roll because it is generally of a higher surface energy material.

These problems have lead to the use of the application of release agents to the fuser members to insure that the toner is completely released from the fuser roll during the fusing operation. However, the application of release agents requires a means to continuously supply a thin film of the release oil which is typically a silicone oil, particularly polydimethyl silicone oil, thereby requiring additional, expensive components, periodic maintenance of the release agent management system, as well as periodic replenishment of the release agent fluid. In addition, such systems may typically comprise a fuser roll made of a silicone elastomer as well as a release agent made from a silicone oil which frequently leads to the swelling of the elastomer by the oil and the subsequent failure of the silicone elastomer in the fusing operation.

Accordingly, there is a continuing need for dry release hot roll fuser members.

PRIOR ART

U.S. Pat. No. 4,357,388 (Minor) describes a dry release hot roll fuser for an addition cured polyorganosiloxane formed of a mixture of 70 parts of polymethylvinylsiloxane where the vinyl groups are terminating groups and 30 parts of a blended polymer consisting of the polymethylvinylsiloxane and polymethyl-H-siloxane in which the hydride function is greater than two.

SUMMARY OF THE INVENTION

In accordance with the present invention a dry release fuser member for use in an electrostatographic reproducing machine without the application of an external release agent comprises a base support member and a thin deformable layer of a composition coated thereon which is the crosslinked product of a mixture of about, (a) 100 parts by weight of at least one addition curable vinyl terminated or vinyl pendant polyfluoro organosiloxane, (b) from about 2 to about 300 parts by weight filler, (c) from about 0 to about 5 parts by weight of a heat stabilizer, (d) a crosslinking agent and crosslinking catalyst present in amounts sufficient to promote crosslinking of the at least one polyfluoro organosiloxane.

In a further aspect of the present invention, the addition curable vinyl terminated or vinyl pendant polyfluoro organosiloxane has the formula:

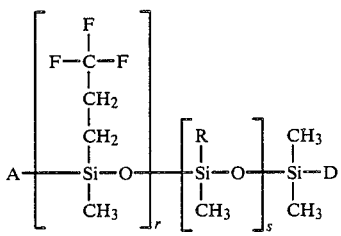

where A and D are methyl or vinyl, R is methyl vinyl or trifluoropropyl provided that the vinyl functionality is at least 2, $$0 < \frac{s}{r} \leq 1,350 < r + s < 2700$$

In a further aspect of the present invention, the mixture prior to crosslinking includes from about 5 to about 30 parts by weight of a polyorganosiloxane oil.

In a further aspect of the present invention, the polyfluoroorganosiloxane may be blended with another liquid addition curable vinyl terminated or vinyl pendant polyorganosiloxane.

In a further aspect of the present invention, the fuser member comprises a rigid cylindrical metallic roll with a high temperature resistant elastomeric layer intermediate the roll and the thin layer.

In a further aspect of the present invention, ferric oxide is present as a heat stabilizer.

In a further principle aspect of the present invention, a method of heat fusing toner images to a substrate is provided which does not require the application of a release agent to the fuser member.

DETAILED DESCRIPTION OF THE INVENTION

Figure 1:
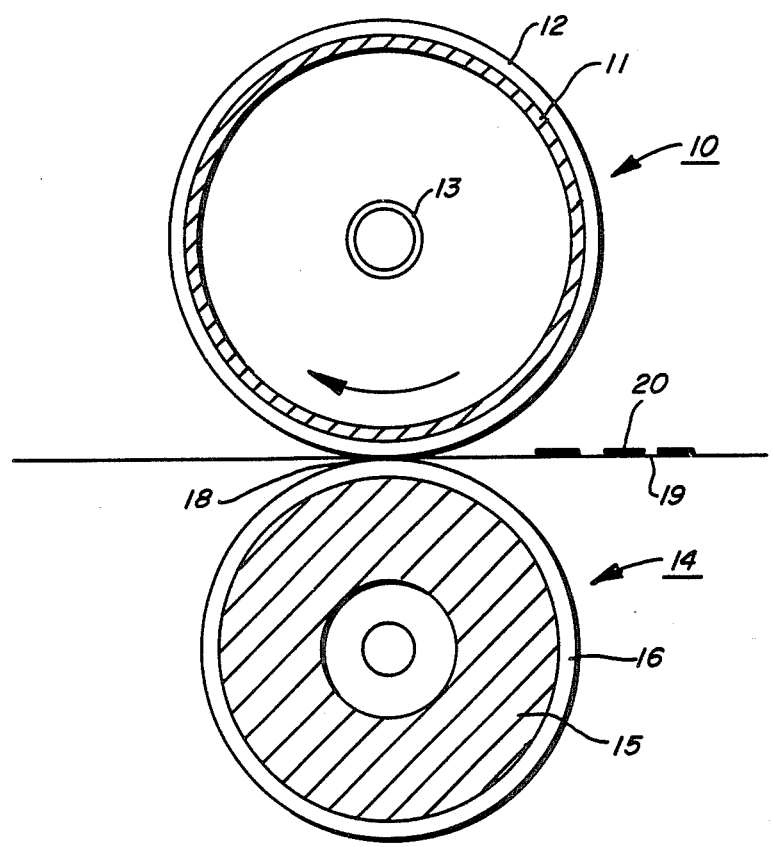
FIG. 1 is a sectional view of a dry roll fuser system which may use the fuser roll of the present invention.

FIG. 1 shows a fuser roll 10 useful for use in the present invention. Although the fuser member shown in FIG. 1 is in the form of a roll, it is to be understood that the present invention is applicable to fuser members of other shapes, such as plates or belts. In FIG. 1, the fuser roll 10 is composed of a core 11 having coated thereon a thin layer 12 of the elastomer according to the present invention. The core 11 may be made of various metals such as iron, aluminum, nickel, stainless steel, etc., and various synthetic resins. Aluminum is preferred as the material for the core 11, although this is not critical. The core 11 is hollow and a heating element 13 is generally positioned inside the hollow core to supply the heat for the fusing operation. Heating elements suitable for this purpose are known in the prior art and may comprise a quartz heater made of a quartz envelope having a tungsten resistance heating element disposed internally thereof. The method of providing the necessary heat is not critical to the present invention, and the fuser member can be heated by internal means, external means or a combination of both. All heating means are well known in the art for providing sufficient heat to fuse the toner to the support. The composition of layer 12 will be described in detail below.

The fuser roll 10 is shown in a pressure contact arrangement with a backup or pressure roll 14. The pressure roll 14 comprises a metal core 15 with a layer 16 of a heat-resistant material. In this assembly, both the fuser roll 10 and the pressure roll 13 are mounted on shafts (not shown) which are biased so that the fuser roll 10 and pressure roll 14 are pressed against each other under sufficient pressure to form a nip 18. It is in this nip that the fusing or fixing action takes place. It has been found that the quality of the copies produced by the fuser assembly is better when the nip is formed by a relatively hard and unyielding layer 16 with a relatively flexible layer 12. In this manner, the nip is formed by a slight deformation in the layer 12 due to the biasing of fuser roll 10 and the pressure roll 14. The layer 16 may be made of any of the well known materials such as polytetrafluoroethylene, polyperfluoroalkoxy resin, fluorinated ethylene-propylene copolymer or silicone rubber.

A sheet of support material 19 such as paper bearing thereon toner image 20 passes between the fuser roll 10 and the pressure roll 14 and the toner image thereon is fused.

Figure 2:
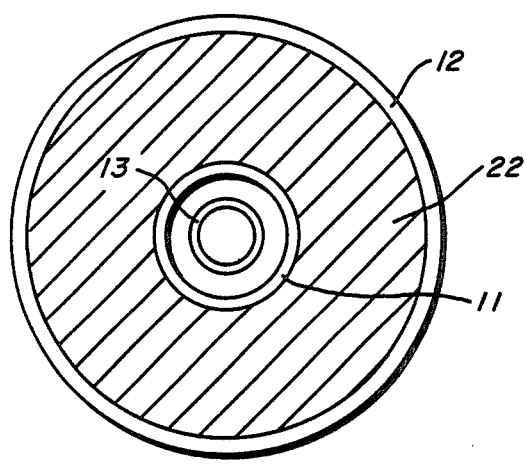
FIG. 2 is a cross-sectional view of an alternative embodiment of the fuser roll.

FIG. 2 illustrates an alternative embodiment wherein intermediate the thin layer 12 and the supporting core 11 is an intermediate high temperature resistant elastomeric layer 22 which may be of any suitable material. Typical materials which can be used for this intermediate layer include HTV silicone rubbers, addition curable silicone rubbers, or copolymer of vinylidene fluoride and hexafluoropropylene and terpolymers and tetrapolymers based on vinylidene fluoride, hexafluoropropoylene and tetrafluorethylene available from E. I. DuPont de Nemours & Company under the trademark Viton.

The thin deformable dry release fuser layer may be comprised of a crosslinked product of a mixture containing at least one suitable addition curable vinyl terminated or vinyl pendant polyfluoro organosiloxane. Typically the siloxanes employed contain vinyl groups at the chain ends and/or scattered randomly along the chain which during curing are crosslinked with siloxanes having anything more than two silicon hydrogen bonds per molecule. These siloxanes also typically contain trifluoropropyl groups which it is believed provide the desired very low surface energy to enable the thin layer to exhibit the desired dry release properties. These materials are suitable for injection and compression molding techniques and can be cured at temperatures of from about 100° C. to about 250° C. with the faster cures being obtained at the higher temperatures. They can be injection molded at pressures of from 500 to 3000 psi. Typical materials are represented by the formula:

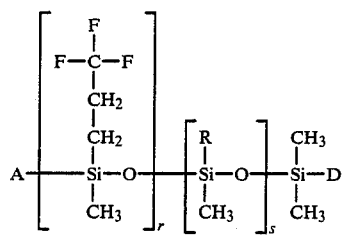

where A and D are methyl or vinyl, R is methyl, vinyl or trifluoropropyl provided that the vinyl functionality is at least 2, $$0 < \frac{s}{r} \leq 1{,}350 < r + s < 2700$$

By the term vinyl functionality is at least two it is meant that in the formula for each molecule there must be at least a total of two vinyl groups in the A, D, or any of the several R sites within the formula. In the presence of suitable catalysts such as solutions or complexes of chloroplatinic acid or other platinum compounds and alcohols, ethers or divinylsiloxanes, reaction occurs with temperatures of 100° C. to 250° C. with the addition of polyfunctional silicone hydride to the unsaturated groups in the siloxane chain. Typical hydride crosslinkers are methylhydro methyltrifluoropropyl siloxane copolymers with about 15% to 70% methylhydrogen. Elastomers so produced exhibit increased toughness, tensile strength, and dimentional stability. Typically these materials comprise the addition of two separate parts of the formulation. Part A containing the vinyl terminated polyfluoroorganosiloxane, the catalyst and the filler, Part B containing the same or another vinyl terminated polyfluoroorganosiloxane, the crosslink moiety such as the hydride functional silane and the same or additional filler where Part A and Part B are normally in a weight ratio of 1:1. Typical of the materials which may be employed in the practice of the present invention is FSL 7210 fluorosilicone liquid rubber available from General Electric Corporation. During the addition curing operation the material is crosslinked via the equation $\equiv$SiH+CH$_2$=CHSi$\equiv$→$\equiv$SiCH$_2$CH$_2$Si$\equiv$. Since hydrogen is added across the double bond no offensive byproducts such as acids or alcohols is obtained.

The composition also includes typical filler materials to provide mechanical strength as well as desired thermal properties. Typically from about 2 to about 300 parts by weight of finely divided fillers are present per 100 parts of the polyfluoroorganosiloxanes. Typical materials that may be used as filler materials are calcined alumina, tabular alumina, as well as several forms of silica such as fumed silica, silica aerogel, calcined diatomaceous silica, clay and ground silica. The size of the filler material is preferred to be not larger than about 325 mesh in order to be uniformly dispersed through the composition and to not create large flaws which lead to premature failure. Submicron high surface area fumed silica is preferred in providing the desired strength.

The crosslinking agent used in a composition is for the purpose of obtaining a material with sufficient crosslink density to obtain maximum strength and fatigue resistances. Examples of typical crosslinking agents have been identified above. The amount of crosslinking agent employed is not critical as long as the amount used is sufficient to sufficiently crosslink the active groups with the polymer used. Crosslinking catalysts are well known in the art and include among others the chlorophtalinic acid as mentioned above. The amount of catalyst employed is not critical however, too small an amount of catalyst may lead to a very slow reaction which is impractical. On the other hand, excessive amounts of catalysts may cause a breakdown of the crosslinked polymer network a high temperatures, to yield a less crosslinked and weaker material, thus adversely effecting the mechanical and thermal properties of the cured material.

The mixture prior to curing may also contain additional, optional ingredients. For example, it may contain up to about 5 parts by weight of a heat stabilizer such as iron oxide, titanium dioxide, cerium oxide, or barium zirconate. Furthermore, it may contain from about 5 to 30 parts by weight of a polyorganosiloxane oil in order to obtain a softer, lower durometer rubber. Typical polyorganosiloxane oils are polydimethylsilicone oils represented by the formula where 75>n>1600.

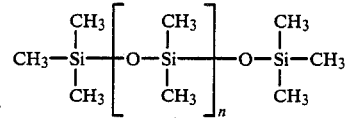

While the polyfluoroorganosiloxane may be employed alone, it also may be used in the form of a blend with other liquid addition curable vinyl terminated or vinyl pendant siloxanes polyorganosiloxanes. These siloxanes also contain vinyl groups at the chain ends and/or scattered randomly along the chain which during curing are crosslinked with siloxanes having anything more than two silicon hydrogen bonds per molecule.

Typical materials are represented by the formula:

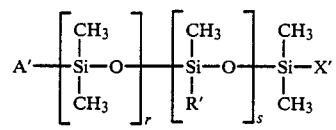

where A', X' and R' are methyl or vinyl provided the vinyl functionality is at least 2, $$0 < \frac{s}{r} \leq 1{,}350 < r + s < 2700$$

By the term the vinyl functionality is at least 2 is meant that in the formula for each molecule there must be at least a total of 2 vinyl groups in the A', X' or any of the several R' sites within the formula. As with the polyfluoroorganosiloxanes, in the presence of suitable catalysts such as solutions or complexes of chloroplatinic acid or other platinum compounds in alcohols, ethers or divinylsiloxanes reaction occurs at temperatures of about 100° C. to 250° C. with the addition of polyfunctional silicon hydride to the unsaturated groups in the polysiloxane chain. Typical hydride crosslinkers are methylhydrodimethylsiloxane copolymers with about 15–70 percent methylhydrogen. Elastomers so produced also exhibit increased toughness, tensile strength and dimensional stability. Typically, these materials also comprise the addition of two separate parts of the formulation, part A containing the vinyl terminated polyorganosiloxane, the catalyst and the filler, part B containing the same or another vinyl terminated polyorganosiloxane, the crosslink moiety such as hydride functional silane and the same or additional filler where part A and part B are normally in a ratio of one to one. The fillers employed may be the same as those used with the polyfluoroorganosiloxane and may be present in about the same amount. Typically the commercially available addition curable polyorganosiloxanes and polyfluoroorganosiloxanes contain from about 5 to about 50 parts filler per 100 parts of parts A and B combined. Typical of the materials which may be employed in the practice of the present invention are those commercially available from Dow Corning under the designation Silastic 590, 591, 595, 596, 598 and 599. In addition, similar materials are available from General Electric Corporation under the designation GE 2300, 2400, 2500, 2600 and 2700. During the addition curing operation the material is crosslinked through the same mechanism as the polyfluoroorganosiloxane.

The blends of the polyfluoroorganosiloxane with the other liquid addition curable siloxane typically comprises mixing parts A and B of the polyfluoroorganosiloxane with parts A and B of the other liquid addition curable siloxanes in a weight ratio of 100 parts of parts A and B combined of the polyfluoroorganosiloxane to 10 to 900 parts of parts A and B combined of the other addition curable siloxane.

The thin deformable layer may be applied to the base support member such as the rolls illustrated in FIGS. 1 and 2 or other flat or curved surface plate member by injection or pressure molding or more preferably, by spraying the uncured mixture onto the support member in successive thin layers of 1 to 2 mils to a total thickness of from about 7 to 100 mils. After the mixture is applied to the base support member, it is cured or crosslinked at temperatures from 100° C. to 250° C. for a period of about 1 hour after which it may be subjected to a post curing operation for up to 8 hours at temperatures of the order of 200° C. to 240° C. When the mixture is applied directly to the base support member such as illustrated in FIG. 1, a tie coat or primer may be applied to insure adhesion between the cured elastomer and the core. Typical primers include General Electric 4171 which is believed to be a dimethylpolysiloxane-ethylpolysilicate in an acetone/isopropanol solvent.

In an alternative embodiment as illustrated in FIG. 2, an intermediate layer of a high temperature resistant elastomer such as HTV silicone rubber, Viton or addition cured silicone rubber may be applied between the base support and the thin layer to a total thickness of from 7 to 100 mils with the thin outer layer being about 1 to 4 mils thick. In a preferred embodiment the intermediate layer may comprise the crosslinked product of a liquid addition curable vinyl terminated or vinyl pendant polyorganosiloxane as previously discussed for blending with the polyfluoroorganosiloxane. While this intermediate layer may be sprayed on in thin layers because of its thickness it is preferred to mold it on the base support and at least partly cure it prior to applying the thin deformable outer layer.

In the Example which follows, all parts and percentages are by weight unless otherwise specified. A fuser member comprising a thin deformable layer according to the present invention was prepared as follows and tested in a Xerox 2830 copier. 13 parts by weight of Part A of General Electric FSL 7210 where added to 13 parts by weight of Part B of General Electric FSL 7210 together with 74 parts by weight of methylethylketone solvent to a cylindrical container and rolled in a roll mill until a uniform dispersion was obtained. Part A is generically believed to be a polyfluoroorganosiloxane where the vinyl groups are terminating groups and which contains a substantial proportion of methyltrifluoropropylsiloxane units. Part A also contains about 0.9 parts by weight platinum catalyst, about 3.8 parts by weight filler and about 6.6 parts by weight silicone oil, all parts based on 100 parts of polyfluoroorganosiloxane. Part B is believed to be a blended polymer including the polyfluoroorganosiloxane polymer in A together with a polyfunctional silicone hydride in which the hydride function is greater than 2, about 1.9 parts by weight silicone oil, 0.8 parts by weight platinum catalyst, 1.2 parts by weight filler and 0.3 parts by weight iron oxide. All parts based on 100 parts of polyfluoroorganosiloxane and polyfunctional silicone hydride combined. A Xerox 2830 aluminum fuser roll core was decreased with chloroethane, blasted with 46 grit aluminum oxide and degreased once again. GE 4171 primer for fluorosilicones was applied to the fuser roll core to promote adhesion between the core and the polyfluoroorganosiloxane. The uniform dispersion was sprayed on the core in thin layers with a Brinks spray gun, each layer being 1 to 2 mils thick and allowed to dry until a thickness of 8 to 9 mils was achieved. The coated fuser roll was oven cured for 1 hour at 149° C. followed by a post cure of 8 hours at 232° C. The surface of the fuser roll was sanded to a roughness of 15 to 20 microinches as measured on a Gould surfanalyzer and the roll was mounted in a 2830 with a standard Xerox 2830 silicone rubber pressure roll to give a fusing nip of 6 to 6.5 millimeters. Stripper fingers were used to enable paper release. Prints were made using a toner comprising Pliolite resin, a styrene butadiene copolymer resin, commercially available from Goodyear Tire and Rubber Company, propylene wax, carbon black, as described in U.S. Pat. No. 4,556,624 with the addition of a small amount of colloidal silica. 100,000 copies were run with minimum fix temperature MFT, and hot offset temperature H.O.T. being evaluated at 0, 40,000, 60,000 80,000 and 100,000 copies as illustrated in the following table.

| COPY COUNT | MFT | H.O.T. | GLOSS S.A.D. | G.G.U.[1] |
|---|---|---|---|---|
| 0K | 310° F. | no offset at 400° F. | 1.50 | 1.5 |
| 40K | 335° F. | no offset at 400° F. | 1.50 | 4.3 |
| 60K | 335° F. | no offset at 400° F. | 1.50 | 5.9 |

| COPY COUNT | MFT | H.O.T. | GLOSS S.A.D. | G.G.U.[1] |
|---|---|---|---|---|
| 80K | 350° F. | no offset at 400° F. | 1.45 | 6.1 |
| 100K | 360° F.[2] 340° F.[3] | no offset at 450° F. | 1.47 | 6.9 |

[1] Gardner Gloss Units
[2] Aged pressure Roll - 4.5 mm Nip
[3] New Pressure Roll - 6.0 mm Nip As used herein the minimum fix temperature is the minimum temperature required to produce an acceptable toner fix to paper. The hot offset temperature is the minimum temperature at which toner will offset to the fuser roll and then to a subsequent copy. The difference between them is the fusing latitude. An acceptable fusing latitude would be about 50 Fahrenheit degrees.

As illustrated in the table, the minimum fix temperature at the outset was found to be 310° F. and there was no offset at 400° F. The minimum fix temperature rose to about 335° F. at 40,000 copies and remained essentially constant beyond that point. The increase to 350° F. at 80,000 and 360° F. at 100,000 was due to a reduction in the nip width and therefore dwell time as the pressure roll aged. This nip was measured at 80,000 and 100,000 copies and found to be irregular averaging about 4.5 millimeters instead of the nominal 6 to 6.5 millimeters. At 100,000 copies the pressure roll was replaced and the nip returned to 6 to 6.5 millimeters. The minimum fix temperature at 100,000 copies with the new pressure roll was found to be 340° F. Offset did not occur at 450° F., the highest temperature tested. During the entire test the fuser roll remained free of visible offset however, a gradual random accumulation of toner was seen on the pressure roll. This is believed to be due to trace amounts of toner transferring from the fuser roll to the higher surface energy pressure roll between documents. The pressure roll was therefore cleaned with xylene about every 15,000 copies throughout the test.

As may be observed no degradation in the hot offset temperature was detected and accordingly good release without the use of a release agent was achieved. This appears to be due to the lower surface energy of the fluorosilicone rubber. Furthermore fusing latitude was found not to be dependent upon the release of trace amounts of silicone oil from the roll as is generally thought to be a contributing factor with standard silicone rubber rolls. This result is believed unexpected since prior experimentation with HTV peroxide curable fluorosilicone materials loaded with silica and having the trifluoropropyl group in the fluorosilicone demonstrated poor release. It is also surprising in view of the prior experiments with fillerless RTV condensation curable fluorosilicones in that they exhibited poor strength, low thermal conductivity and poor adhesion. Thus, the present elastomer comprising the crosslinked product of at least 1 liquid addition curable vinyl terminated or vinyl pendant polyfluoroorganosiloxane which has a small amount of filler in it and still shows good release properties over the peroxide curable fluorosilicone and better adhesion and strength than the RTV condensation curable fluorosilicone. Throughout the entire test, the hot offset temperature remained high and the fuser roll did not become contaminated with paper fibers, toner and other debris to raise the surface energy to a level where release degrades.

All gloss measurements were made on a Gardner Glossguard II Meter. As indicated in the table the copies produced had acceptable levels of gloss in that all the gloss readings were below 10, the generally acceptable upper limit for satisfactory customer copy quality. The solid area density (S.A.D.) was measured with a MacBeth denistometer and the values indicate a very dense patch of toner was put down on the copy since most copies produced from commercially available apparatus have an S.A.D. of about 1.2 to 1.4.

All the patents referred to herein are hereby specifically and totally incorporated by reference in their entirety in the instant specification.

While the invention has been described in detail with reference to specific and preferred embodiments, it will be appreciated that various modifications and variations will be apparent to the artisan. For example, while the invention has been illustrated with reference to a fuser roll, it will be understood that it has equal application to other fuser members such as flat or curved plate members in pressure contact with a roll. All such modifications and embodiments as may readily occur to one skilled in the art are intended to be within the scope of the appended claims.

What is claimed is:

1. A thermally conductive dry release fuser member for use in an electrostatographic reproducing machine without the application of a release agent comprising a base support member and a thin deformable layer of a composition coated thereon, said composition comprising the crosslinked product of a mixture of about;

(a) 100 parts by weight of at least one liquid addition curable vinyl terminated or vinyl pendant polyfluoroorganosiloxane having the formula:

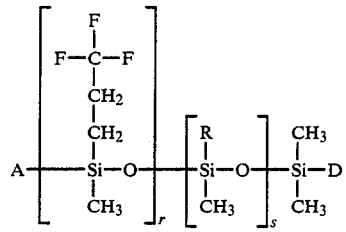

where A and D are methyl or vinyl, R is methyl, vinyl or trifluoropropyl provided that the vinyl functionality is at least 2, $$0 < \frac{s}{r} \leq 1,350 < r + s < 2700$$

(b) from about 2 to about 300 parts by weight filler,
(c) from about 0 to about 5 parts by weight of a heat stabilizer,
(d) a crosslinking agent and a crosslinking catalyst, said crosslinking agent and catalyst being present in an amount sufficient to promote crosslinking of said at least one polyfluoroorganosiloxane.

2. The fuser member of claim 1, wherein said mixture includes from about 5 parts to about 30 parts by weight of a polyorganosiloxane oil.

3. The fuser member of claim 1, wherein said base support member comprises a rigid cylindrical metallic roll.

4. The fuser member of claim 3, wherein said metallic roll has a high temperature resistant elastomeric layer intermediate said roll surface and said thin layer.

5. The fuser member of claim 3, wherein said thin layer is from about 7 mils to about 100 mils thick.

6. The fuser member of claim 4, wherein said intermediate layer and thin layer have a combined thickness from about 7 mils to about 100 mils with the thin layer being from about 1 to 4 mils.

7. The fuser member of claim 3, wherein said metallic roll is aluminum.

8. The fuser member of claim 1, wherein ferric oxide is present in an amount of from about 0.2 to about 5 parts per 100 parts of said polyfluoroorganosiloxane as a heat stabilizer.

9. The fuser member of claim 4, wherein said intermediate layer comprises a crosslinked product of a liquid addition curable vinyl terminated or vinyl pendant polyorganosiloxane.

10. The fuser member of claim 1, wherein said crosslinking agent is a methylhydromethyltrifluoropropyl siloxane copolymer with about 15% to 70% methylhydrogen.

11. The fuser member of claim 1, wherein said mixture includes from about 10 to about 900 parts by weight of at least one liquid addition curable vinyl terminated or vinyl pendant polyorganosiloxane having the formula:

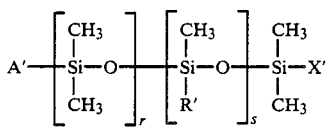

where A', X' and R' are methyl or vinyl provided the vinyl functionality is at least 2, $$0 < \frac{s}{r} \leq 1,350 < r + s < 2700$$

up to about 300 parts by weight of additional filler and sufficient additional crosslinking agent and crosslinking catalyst to promote crosslinking of said polyorganosiloxane.

12. The method of heat fusing toner images to a substrate without the application of a release agent comprising pressure contacting said toner image on a substrate with a dry release fuser member whole surface is heated to a temperature effective to fuse said toner image, said fuser member comprising a base support member and a thin deformable layer of a composition coated thereon, said composition comprising the crosslinked product of a mixture of about;

(a) 100 parts by weight of at least one liquid addition curable vinyl terminated or vinyl pendant polyfluoroorganosiloxane having the formula:

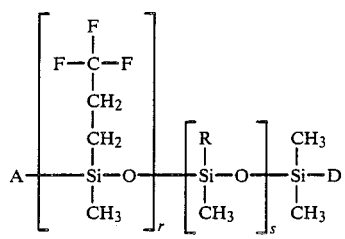

where A and D are methyl or vinyl, R is methyl, vinyl, or trifluoropropyl provided that the vinyl functionality is at least 2

$$0 < \frac{s}{r} \leq 1,350 < r + s < 2700$$

(b) from about 2 to about 300 parts by weight filler,
(c) from about 0 to about 5 parts by weight of a heat stabilizer,
(d) a crosslinking agent and a crosslinking catalyst, said crosslinking agent and catalyst being present in an amount sufficient to promote crosslinking of said at least one polyfluoroorganosiloxane.

13. The method of claim 12, wherein said mixture includes from about 5 parts to about 30 parts by weight of a polyorganosiloxane oil.

14. The method of claim 12, wherein said base support member comprises a rigid cylindrical metallic roll.

15. The method of claim 14, wherein said metallic roll has a high temperature resistant elastomeric layer intermediate said roll surface and said thin layer.

16. The method of claim 14, wherein said thin layer is from about 7 mils to about 100 mils thick.

17. The method of claim 15, wherein said intermediate layer and thin layer have a combined thickness from about 7 mils to about 100 mils with the thin layer being from about 1 to 4 mils.

18. The method of claim 14, wherein said metallic roll is aluminum.

19. The method of claim 12, wherein ferric oxide is present in an amount of from about 0.2 to about 5 parts per 100 parts of said polyfluoroganosiloxane as a heat stabilizer.

20. The method of claim 14, wherein said intermediate layer comprises a crosslinked product of a liquid addition curable vinyl terminated or vinyl pendant polyorganosiloxane.

21. The method of claim 12, wherein said crosslinking agent is a methylhydromethyltrifluoropropyl siloxane copolymer with about 15% to 70% methylhydrogen.

22. The method of claim 12, wherein said mixture includes from about 10 to about 900 parts by weight of at least one liquid addition curable vinyl terminated or vinyl pendant polyorganosiloxane having the formula:

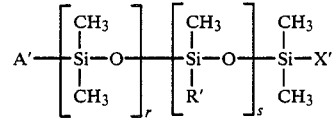

where A', X' and R' are methyl or vinyl provided the vinyl functionality is at least 2, $$0 < \frac{s}{r} \leq 1,350 < r + s < 2700$$

up to about 300 parts by weight of additional filler and sufficient additional crosslinking agent and crosslinking catalyst to promote crosslinking of said polyorganosiloxane.

* * * * *